US011221948B2

(12) United States Patent
Armangau et al.

(10) Patent No.: US 11,221,948 B2
(45) Date of Patent: Jan. 11, 2022

(54) COORDINATED RECLAIMING OF DATA STORAGE SPACE

(71) Applicant: EMC IP Holding Company LLC, Hopkinton, MA (US)

(72) Inventors: Philippe Armangau, Acton, MA (US); Vamsi K. Vankamamidi, Hopkinton, MA (US); Ajay Karri, South Grafton, MA (US); Yubing Wang, Southborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 66 days.

(21) Appl. No.: 16/663,507

(22) Filed: Oct. 25, 2019

(65) Prior Publication Data

US 2021/0124680 A1 Apr. 29, 2021

(51) Int. Cl.
*G06F 12/02* (2006.01)
(52) U.S. Cl.
CPC .. *G06F 12/0253* (2013.01); *G06F 2212/1044* (2013.01); *G06F 2212/262* (2013.01)
(58) Field of Classification Search
None
See application file for complete search history.

(56) References Cited

U.S. PATENT DOCUMENTS

| | | | |
|---|---|---|---|
| 7,702,873 B2 | 4/2010 | Griess et al. | |
| 8,082,390 B1* | 12/2011 | Fan | G06F 11/1092 711/114 |
| 8,713,268 B2 | 4/2014 | Dillow et al. | |
| 8,751,768 B2 | 6/2014 | Malige et al. | |
| 8,949,367 B2 | 2/2015 | Wertheimer et al. | |
| 9,213,496 B2 | 12/2015 | Gibble et al. | |
| 9,361,040 B1 | 6/2016 | Wei et al. | |
| 9,519,439 B2 | 12/2016 | Sundarrajan et al. | |
| 2006/0161707 A1* | 7/2006 | Davies | G06F 11/2089 710/268 |
| 2006/0259687 A1* | 11/2006 | Thomas | G06F 3/0607 711/114 |
| 2006/0277347 A1* | 12/2006 | Ashmore | G06F 11/2092 710/313 |
| 2009/0248763 A1 | 10/2009 | Rajan et al. | |
| 2012/0124106 A1* | 5/2012 | Allen | G06F 12/0276 707/814 |
| 2018/0004656 A1* | 1/2018 | Battaje | G06F 12/0292 |
| 2018/0284995 A1* | 10/2018 | Dantkale | G06F 3/065 |
| 2020/0201767 A1* | 6/2020 | Schumann | G06F 12/1045 |

\* cited by examiner

*Primary Examiner* — Stephanie Wu
(74) *Attorney, Agent, or Firm* — BainwoodHuang

(57) ABSTRACT

Coordinating a reclaiming of data storage space among processing nodes of a data storage system includes, by a first node in response to an event, performing local cleanup of first-node mapping data and issuing a request message to a second node, the request message identifying the data storage space to be reclaimed. The event may be a notification from a RAID component rebuilding a RAID volume. In response to the request message, the second node performs local cleanup of second-node mapping data and issues a completion message to the first node indicating that the second node has completed its part of the reclaiming of the data storage space. The first node responds to the completion message by marking the data storage space as being reclaimed and signaling to a source of the event that the data storage space is available for new use.

14 Claims, 4 Drawing Sheets

COORDINATED RECLAIMING OF DATA STORAGE SPACE

BACKGROUND

The present invention relates to data storage systems and in particular to data storage systems employing mapping of logical storage entities to underlying physical storage.

SUMMARY

When storage space is to be reclaimed, the reclaim information needs to be communicated between multiple nodes in an active-active environment. Mapper components on each of the nodes contain cached copies of mapping information related to the storage space. The cached mapping data on both nodes needs to be purged as part of the reclaiming. Also a deferred background process can have cached mapping information related to the mapping, which also needs to be purged. However, a peer node may have no information about the storage space being reclaimed on another node.

A disclosed technique provides a solution to coordinate reclaiming of units of data storage in a data storage system. The technique employs division of responsibilities between the nodes and uses mailboxes to communicate instructions/ messages between the nodes.

More specifically, a method is disclosed of coordinating a reclaiming of data storage space among processing nodes of a data storage system. The method includes, by a first node in response to an event, performing local cleanup of first-node mapping data and issuing a request message to a second node, the request message identifying the data storage space and indicating that the data storage space is to be reclaimed. In one embodiment the event is a notification from a RAID component that is attending to rebuilding of a RAID volume and requires additional storage space accordingly. As known in the art, RAID is an acronym for "Redundant Array of Independent Disks", an approach to incorporating redundancy to improve resiliency and availability of a data storage system.

The method further includes, by the second node in response to the request message, performing local cleanup of second-node mapping data and issuing a completion message to the first node, the completion message indicating that the second node has completed its part of the reclaiming of the data storage space. Then by the first node in response to the completion message, the data storage space is marked as being reclaimed and a source of the event is signaled that the data storage space is available for new use within the data storage system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

When storage space is to be reclaimed, the reclaim information needs to be communicated between the nodes in an active-active environment. Mapper components on each of the nodes contain cached copies of mapping information related to the storage space. The cached mapping data on both nodes needs to be purged as part of the reclaiming. Also a deferred background process can have cached mapping information related to the mapping, which also needs to be purged. However, a peer node may have no information about the storage space being reclaimed on another node.

A disclosed technique provides a solution to coordinate reclaiming of units of data storage in a data storage system. The technique employs division of responsibilities between the nodes and uses mailboxes to communicate instructions/ messages between the nodes.

The technique is described in the context of a particular use case, which is the reclaiming of storage to obtain storage extents for rebuilding a RAID volume. When a RAID component wants storage to be reclaimed as part of a rebuilding process, it periodically sends notifications to the processing nodes, and continues to send notifications until it gets back a reply and information about the reclaimed storage space. The RAID notifications are used to trigger activities as well as messaging. In one embodiment, when the RAID component sends a notification, a mapper component intercepts the reclaim request from RAID. The node which first receives the notification (primary node) selects the storage range which is the best candidate to reclaim based on specific criteria, and posts a message in the peer's (secondary node) mailbox instructing the peer to reclaim the storage. The primary node also starts the process of cleanup of local cached mapping data, then notifies the peer node (secondary) that the message in its mailbox is ready to be consumed. The secondary node reads its mailbox when it receives RAID notifications, and consumes a message from the primary node when the primary node has marked the message as ready to be consumed. The secondary node cleans up its locally cached mapping data and then performs the reclaiming (i.e., relocating data and updating the persistent mapping data for the storage range). The secondary then removes the message from its mailbox and posts a completion message on the primary mailbox that the reclaiming is completed. The primary node reads its mailbox on the next RAID notification and initiates the cleanup of deferred background process cached mapping data. After the cleanup is done it notifies the RAID component that the storage has been reclaimed successfully, and removes the completion message from its mailbox.

The above describes one node as a primary and another node as a secondary for one reclaiming request. Multiple reclaiming operations can be performed concurrently, and each node may serve as either a primary or as a secondary for respective reclaiming operations.

EMBODIMENTS

Figure 1:
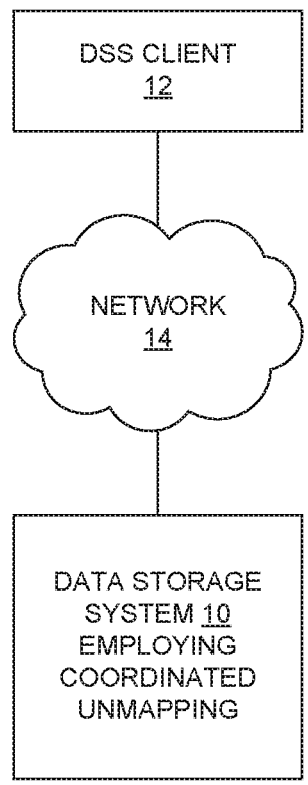
FIG. 1 is a block diagram of a computer system.

FIG. 1 shows a computer system having a data storage system 10 coupled to one or more data storage system (DSS) clients 12 by a network 14. In a typical case a DSS client 12 is a host computer such as a server computer executing one or more application programs (applications) for which the secondary storage (block or file) is maintained by the data storage system 10, with the network 14 conveying data storage requests and responses, as well as associated data. For example, a DSS client 12 performs a write operation to a block-oriented storage device by issuing a write request that specifies the device, the starting logical address, and the length, as well as the associated write data. The network 14 conveys the write request and write data to the data storage system 10, which stores the write data on the identified device beginning at the specified logical address. A DSS client 12 performs a read operation to a block-oriented device by issuing a read request that specifies the device, the starting logical address, and the length. The network 14 conveys the read request to the data storage system 10, which obtains the data from the specified device beginning at the specified logical address and returns the data to the DSS client 12 via the network 14. The data storage system 10 may present storage resources to the DSS clients 12 in additional or alternative ways, such as in the form of a network-level or distributed file system, or as virtual volumes or similar virtualized storage containers for use by DSS clients 12 hosting virtual machines, such as ESX® hosts (servers) for example.

As indicated at 10, the data storage system 10 employs a certain technique of coordinated reclaiming of data storage space that is used in connection with data storage operations. Details and advantages of this technique are described below.

Figure 2:
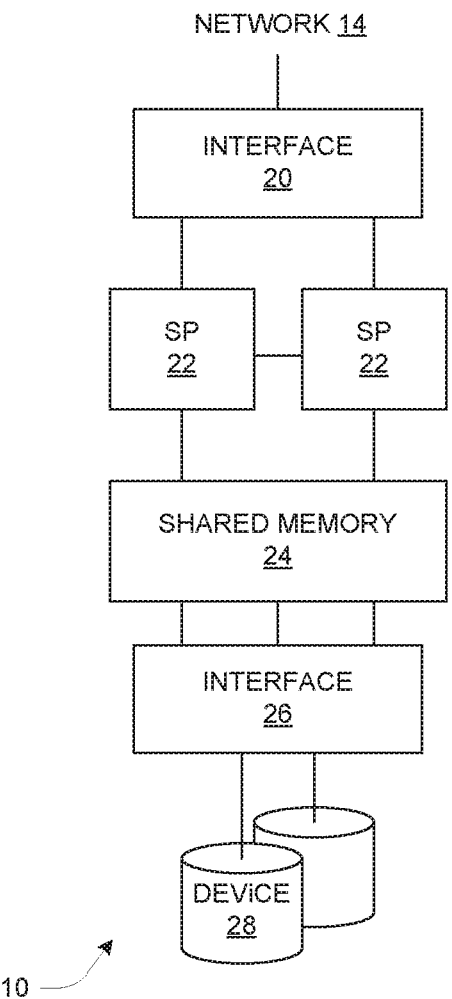
FIG. 2 is a block diagram of a data storage system.

FIG. 2 is a block diagram of the data storage system 10 from a hardware perspective. It includes an interface 20 to the network 14, a pair of storage processors (SPs) 22, shared memory 24, and an interface 26 to secondary storage devices (DEVICE) 28, such as magnetic disks, Flash drives, etc. The interface 20 may include one or more network adapters such as a FibreChannel adapter, Gigabit Ethernet adapter, etc., and the interface 26 may similarly include storage-oriented adapters such as FibreChannel adapters etc. Each storage processor 22 executes software causing the storage processor 22 to present logical or virtualized storage resources to the network 14 and DSS clients 12, employing the devices 28 for the underlying physical storage. The logical or virtualized storage resources may include either or both block-oriented devices (e.g., logical storage units (LUNs), virtual volumes (VVOLS), etc.) and/or client-visible file systems (e.g., NFS, CIFS, etc.) The shared memory 24 may be used for one or more device caches, also referred to as a "storage cache", for caching data of the devices 28. In the remaining description, a storage processor 22 may also be referred to as a "node". The configuration of FIG. 2 is illustrative but not necessarily limiting—the disclosed technique may be practiced more generally in configurations having a plurality of processing nodes, and in configurations where the processing nodes may be more loosely coupled than in the arrangement of FIG. 2. Further details of the structure and operation of the data storage system 10 are provided below.

Figure 3:
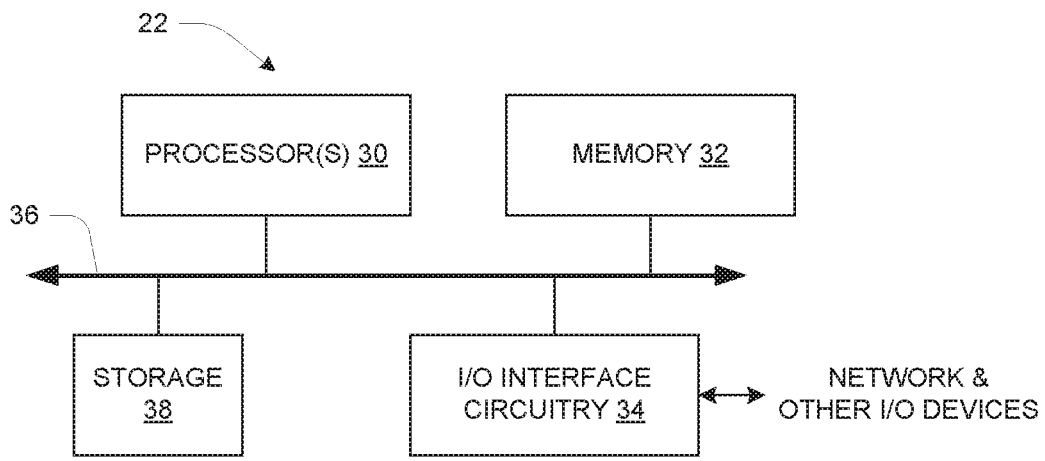
FIG. 3 is a hardware block diagram of a storage processor.

FIG. 3 shows an example configuration of a storage processor 22 from a computer hardware perspective. The hardware includes one or more processors 30, memory 32, and interface circuitry 34 interconnected together by data interconnections 36 such as one or more high-speed data buses. The interface circuitry 34 provides a hardware connections to the shared memory 24 and interfaces 20, 26 (FIG. 2) and perhaps other external devices/connections (EXT DEVs). The processor(s) 30 with connected memory 32 may also be referred to as "processing circuitry" herein. A storage processor 22 may also have its own local secondary storage 38 such as a Flash memory array. In operation, the memory 32 stores data and instructions of system software (e.g., operating system) and one or more application programs which are executed by the processor(s) 30 to cause the hardware to function in a software-defined manner. Thus the computer hardware executing instructions of a data storage application, such as described below, can be referred to as a data storage circuit or data storage component, and it will be understood that a collection of such circuits or components can all be realized and interact with each other as one or more sets of computer processing hardware executing different computer programs as generally known in the art.

Figure 4:
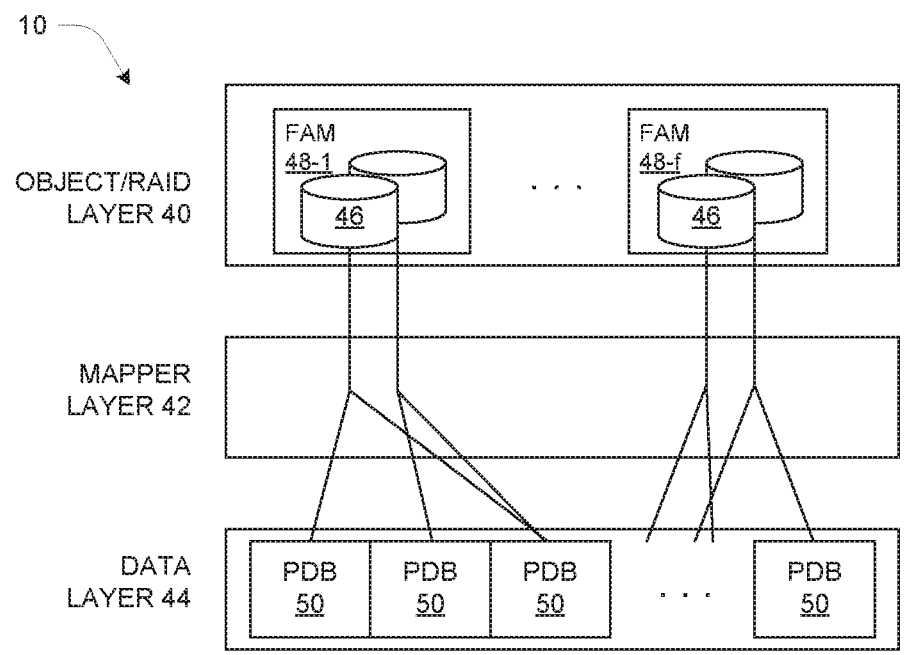
FIG. 4 is schematic diagram of a multi-layer functional organization of a data storage system.

FIG. 4 is a functional/logical view of certain aspects of the data storage system 10. It will be appreciated that much of the functionality is realized by software executed by the storage processors 22, apart from the physical storage of data which is provided by the devices 28 (FIG. 2). In the view of FIG. 4 there are three functional layers—an object/RAID layer 40, a mapper layer 42 and a data layer 44. These are described in turn.

The object/RAID layer 40 establishes and maintains logical views of the secondary storage that are referred to as volumes 46, and presents the volumes 46 to the hosts 10 (FIG. 1) as the objects of storage operations (e.g., reads and writes). The volumes 46 may be organized into families 48 (shown as FAM 48-1, . . . , FAM 48-*f*) as shown, where the volumes 46 of a family 48 include a current or "primary" volume 46 and a collection of point-in-time copies of that primary volume, referred to as "snapshot" volumes 46 (or simply "snapshots" or "snaps"). This layer employs Redundant Array of Independent Disks (RAID) techniques in realizing the volumes 46, i.e., each volume 46 employs a redundant configuration of underlying physical storage (of data layer 44) that provides desired resilience in the face of failures. In general, a RAID-implemented volume can remain available even upon a single failure, but whenever a RAID group experiences a failure it must be rebuilt to restore its full resilience. The present description refers to a particular use case in which a degraded RAID volume is being rebuilt, which requires reclaiming some amount of presently-mapped storage so that it can be reassigned for use in rebuilding the degraded RAID volume. Other use cases are possible.

The data layer 44 maintains the actual data for the volumes 46, as respective collections of physical data blocks (PDBs) 50. In one embodiment, the PDBs 50 are physical data blocks of an internal file system of the mapper layer 42. The PDBs 50 are of a fixed size, such as 2 MB. The PDBs 50 may be stored in any of a variety of ways on a set of nonvolatile secondary storage media, such as magnetic media, flash-programmable semiconductor media (Flash), etc. Moreover, there may be additional layers of logical structure that translate between the PDB-view of the data and actual physical storage as provided by physical storage devices 28. For example, in one embodiment, raw physical storage provided by storage devices 28 may be carved into large extents from which are served block-sized units for allocation to the volumes 46 and storage of the corresponding data.

The mapper layer 42 is responsible for translating between the logical-volume view of the object/RAID layer 40 and the PDB structuring of the data layer 44. As shown in simplified form, each volume 46 is mapped to a corresponding collection of PDBs 50 by the mapper layer 42. As also simply illustrated, in some cases a given PDB 50 may belong to more than one volume 46, i.e., the mapper layer 42 may map logical data blocks of multiple volumes 46 to the same PDB 50. This feature is referred to as "block sharing", and is used in support of snapshot functionality, for example.

Figure 5:
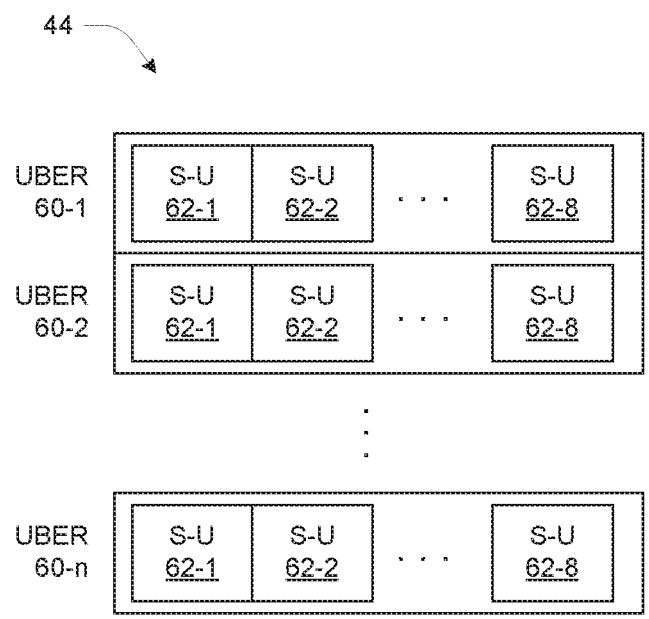
FIG. 5 is a schematic diagram of organization of physical storage.

FIG. 5 illustrates additional structure of the data layer 44. Raw storage space is divided into large extents called "ubers" 60, and each uber 60 is divided into a set of equal-size "sub-ubers" (S-U) 62. A collection of ubers 60 is shown as 60-1, 60-2, . . . , and the sub-ubers 62 of a given uber 60 are shown as 62-1, 62-2, . . . . In one embodiment, each sub-uber 62 has a size of 8 GB, and there are eight sub-ubers 62 per uber 60 (so that each uber 60 has size 64 GB). Other configurations are possible. Generally a system will support some large number of ubers 60 and a corresponding number of sub-ubers 62. For example, a DSS 10 may support up to 64K ubers 60 (i.e., n=64K in FIG. 5), which is equal to 512K sub-ubers 62. In general, each sub-uber 62 is accessible to all SPs 22.

Figure 6:
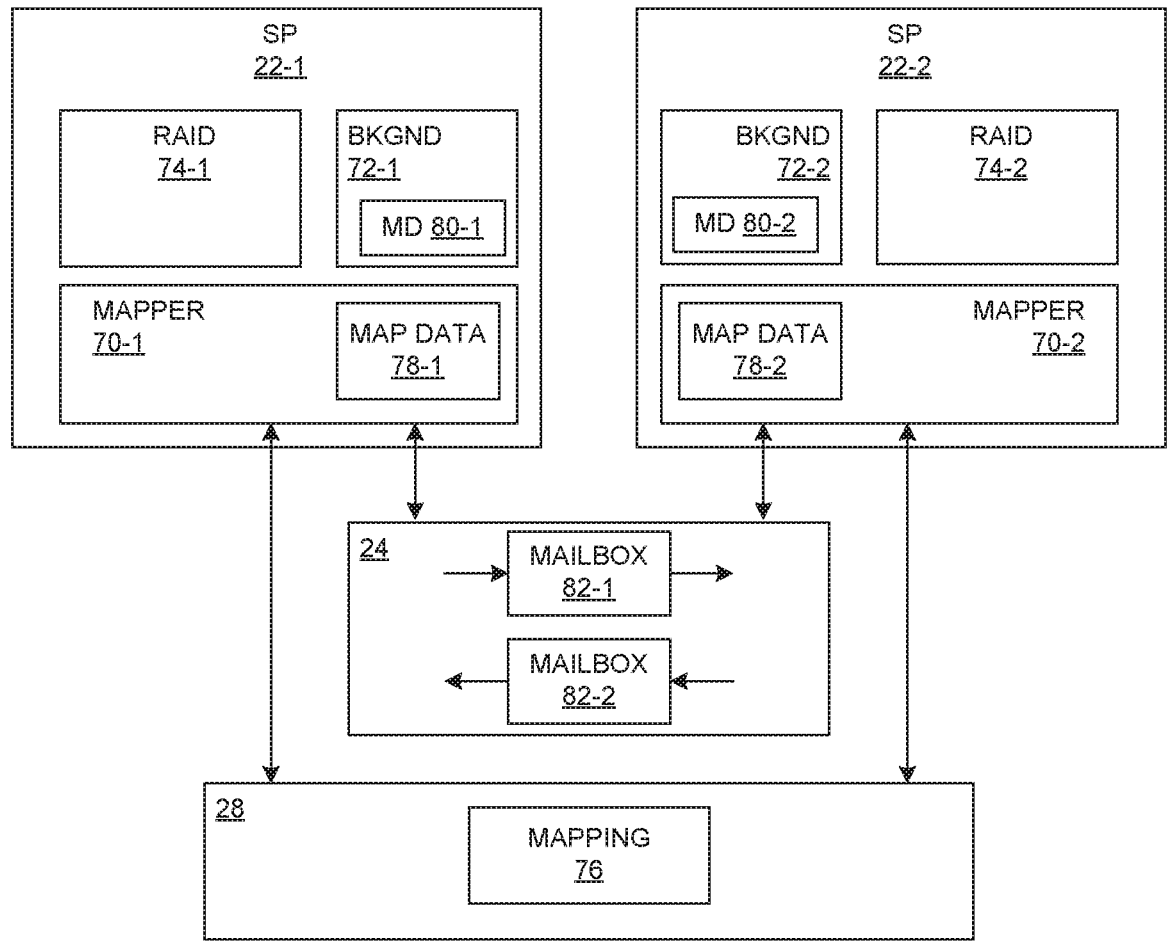
FIG. 6 is a functional block diagram of certain components of the data storage system.

FIG. 6 shows a functional organization of the DSS 10 relating to the coordinating of reclaiming as described herein. Elements of the SPs 22, shared memory 24 and persistent storage 28 are shown. The disclosed technique is performed in large part by mapper components 70-1, 70-2 (generally mapper 70) of the respective SPs 22, the mapper components 70 being part of the mapper layer 42 (FIG. 4). In particular, operations may be extensions of so-called "garbage collection" operation, i.e., regular ongoing processes of cleaning up data structures as they are used, to be ready for later uses. As shown, each SP 22 also includes a respective background component or process (BKGND) 72 and a respective RAID component 74, which is part of the object/RAID layer 40 (FIG. 4). It will be appreciated that the functional blocks 70, 72 and 74 are software-implemented functional blocks, i.e., they are realized by the execution of corresponding computer program instructions by processing circuitry of the SPs 22.

The mappers 70 maintain mapping metadata that expresses the mapping between volumes 46 and PDBs 50, as mentioned above. In general the mapping metadata is quite extensive. For present purposes the description focuses on just one mapping 76, which is the mapping for a corresponding uber 60 that is to be reclaimed so that it can be reallocated for use in rebuilding a RAID volume, as also mentioned above. Generally, the mapping 76 is a data structure having entries that translate between block addresses of one or more volumes 46 to corresponding physical blocks 50 of the uber 60. The mapping 76 is necessarily a persistent structure and thus stored on a disk 28 alongside other metadata as well as the user-visible data of the volumes 46. Additionally, for performance reasons, each SP 22 maintains one or more cached copies of the mapping 76. These cached copies are shown as Map Data 78 (78-1, 78-2) of the respective mapper 70, and MD 80 (80-1, 80-2) of the respective background component 72. The present technique is directed in part to the proper handling of the cached mapping data 78, 80 when a reclaiming occurs, to avoid erroneous use of stale mapping data and attendant incorrect operation.

FIG. 6 also shows the use of a pair of mailboxes 82 (82-1, 82-2) in the shared memory 24. As indicated by the arrows, the mailbox 82-1 is used to pass messages from SP 22-1 to SP 22-2, and the mailbox 82-2 is used to pass messages from SP 22-2 to SP 22-1. If will be appreciated that in an embodiment having more than two independent processing nodes, additional mailboxes would be used accordingly to provide for messaging among all nodes as necessary. In other embodiments, the mailboxes 82 may be stored in persistent storage such as a disk or Flash memory.

Figure 7:
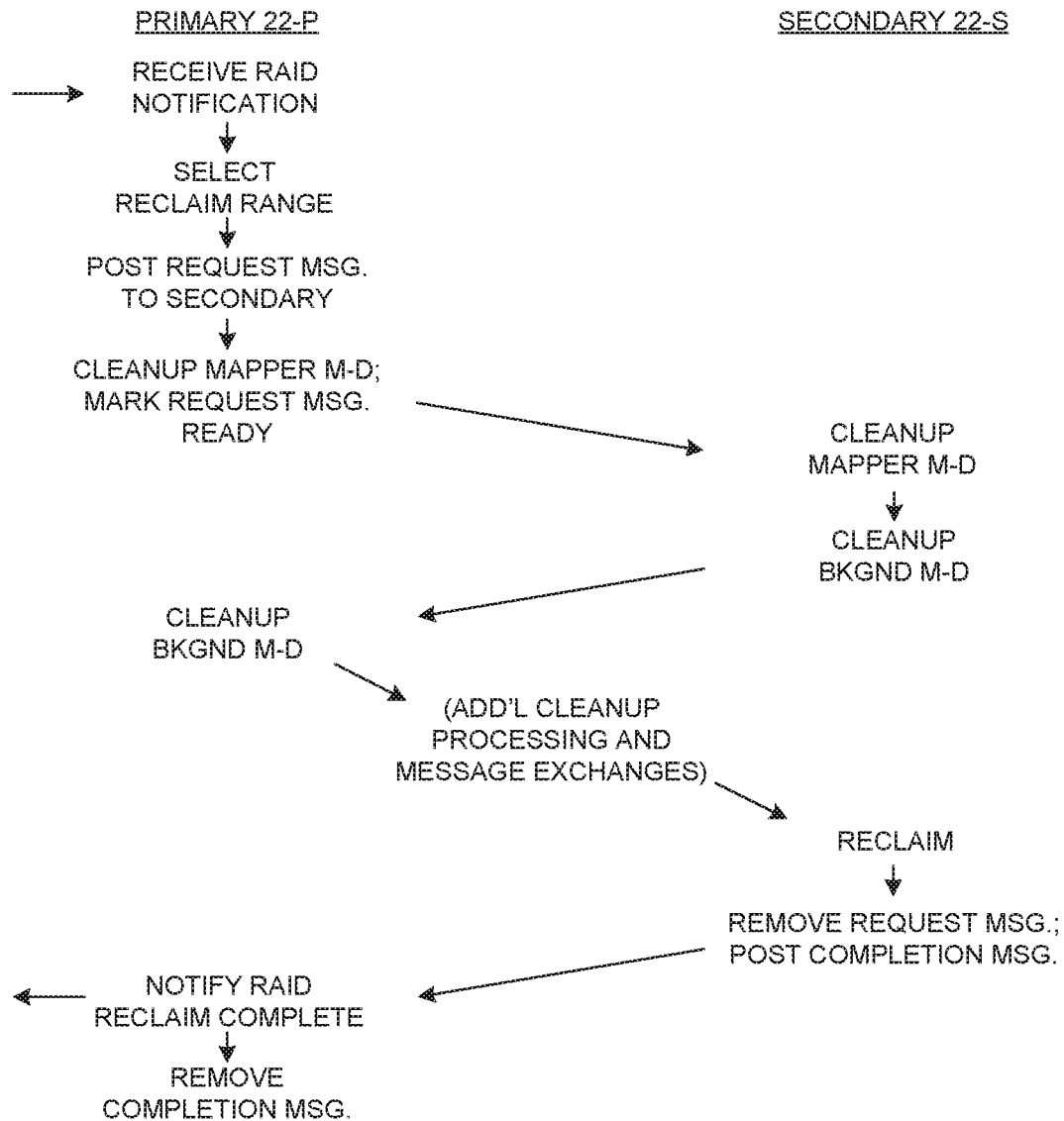
FIG. 7 is a flow diagram of a process of coordinated reclaiming of data storage space.

FIG. 7 is a flow diagram of a reclaiming process that is coordinated between the two SPs 22, which are shown as a primary SP 22-P and a secondary SP 22-S. As explained below, for each given RAID-initiated reclaiming, one of the SPs 22-1 or 22-2 acts as primary 22-P and the other as secondary 22-S, and thus in the process of FIG. 7 the primary SP 22-P can be either of the SPs 22-1 or 22-2, leaving the other SP 22-2 or 22-1 as the secondary SP 22-S. The following description uses an example case in which SP 22-1 is the primary and SP 22-2 is the secondary; it will be appreciated that the description is general and equally applicable when the subscripts are reversed. Additionally, multiple reclaiming processes may be occurring concurrently, with one or more having node 22-1 as primary and one or more having node 22-2 as primary.

When a RAID 74 (e.g., 74-1) sends a notification which includes a reclaim request, the respective mapper 70 (e.g., 70-1) intercepts the reclaim request from the RAID 74. The node 22 (e.g., 22-1) that first receives the RAID notification assumes the role of primary 22-P and performs the operations shown at left in FIG. 7, primarily by operation of the respective mapper 70 (e.g., 70-1). First, it selects a storage range which is the best candidate to reclaim based on certain criteria, and then posts a request message in the appropriate mailbox 82 (e.g., 82-1) for the secondary SP 22-S. The selected storage range is a set of ubers 60 that are part of a recovery group for the RAID 74, and the selection criteria is preferably one that promotes efficiency or other operating goals, such as for example selecting a least-used range, a least-populated range, etc. The request message instructs the secondary SP 22-S to reclaim the storage. At the same time, the primary SP 22-P also performs its own local cleanup of cached mapping data 78 (e.g., 78-1) for the selected range, i.e., removing it from the cache. When this local cleanup is complete, the primary 22-P notifies the secondary 22-S that the request message in the mailbox is ready to be consumed (see Ready status below).

In one embodiment, the request message posted by the primary SP 22-P has the following contents:

Message type (Request, Completion)
Uber ID
Status (Posted; Ready; In Process)

The message type indicates whether the message is a Request message or a Completion message, as described below. The Uber ID is a logical address (in the space of the data layer 44) uniquely identifying the uber 60 to be reclaimed. The Status indicates a processing status of the message. When the message is first posted, it is identified as Posted, indicating that it is not yet ready to be processed. The Ready status indicates that the message is ready to be acted upon by the peer SP (e.g., the secondary 22-S for a Request message). The In Process status indicates that the secondary SP is acting upon the message, so that if the message is encountered multiple times (i.e., over multiple RAID events that trigger querying of the mailbox 82), the processing for it is only initiated once.

Referring again to FIG. 7, the secondary node 22-S reads the mailbox 82 (e.g., 82-1) when it receives a subsequent RAID notification, and when the message is marked as Ready then the secondary 22-S acts on the message content. The secondary node 22-S marks the message as In Process, performs its own local cleanup of mapping data 78 and 80 (e.g., 78-2, 80-2), and posts a Completion message on its outgoing mailbox 82 (e.g., 82-2) indicating that cleanup processing for the Request is complete.

The primary node 22-P reads the respective mailbox 82 (e.g., 82-2) when it receives a subsequent RAID notification, and it responds to the Completion message by performing cleanup of the background mapping data 80 (e.g., 80-1). As indicated, there may be additional exchanges of cleanup messages between the nodes 22-P and 22-S, and associated cleanup operations, for additional ubers 60 of the storage range being reclaimed. When all cleanup has been performed, then the secondary node 22-S performs the actual reclaiming, i.e., moving any user data in the selected region to other regions and then updating the persistent mapping 76 accordingly, to reflect that the ubers 60 of the selected region no longer store any active mapped user data. The secondary SP 22-S then removes the Request message from the mailbox (e.g., 82-1) and signals completion to the primary node 22-P, which responds by notifying the local RAID 74 (e.g., 74-1) that the reclaiming is complete, and then removing the Completion message from the mailbox (e.g., 82-2).

Additionally, when commencing the process of FIG. 7 as described above, the secondary SP 22-S also marks the mapping 76 as "Reclaiming in progress". This prevents any independent process from making any new allocations of space from the associated ubers 60.

FIG. 7 illustrates a particular use of the disclosed technique, which has more general applicability as outlined above and expressed in the claims below. Another feature of the disclosed technique is that the mailboxes 82 can be used to recover an in-progress reclaim operation. If a node encounters a problem, an in-progress reclaim operation can be rolled back or it can be completed based on the steps completed during the time of problem operation on the current node.

While various embodiments of the invention have been particularly shown and described, it will be understood by those skilled in the art that various changes in form and details may be made therein without departing from the scope of the invention as defined by the appended claims.

What is claimed is:

1. A method of coordinating a reclaiming of data storage space among processing nodes of a data storage system, comprising:
    by a first node in response to an event, performing local cleanup of first node mapping data and issuing a request message to a second node, the request message identifying the data storage space and indicating that the data storage space is to be reclaimed;
    by the second node in response to the request message, performing local cleanup of second-node mapping data and issuing a completion message to the first node, the completion message indicating that the second node has completed its part of the reclaiming of the data storage space; and
    by the first node in response to the completion message, marking the data storage space as being reclaimed and signaling to a source of the event that the data storage space is available for new use within the data storage system,
    wherein the data storage system implements redundant array of independent disks (RAID) to realize corresponding RAID volumes, and the reclaiming of the data storage space is performed to obtain storage extents for rebuilding one of the RAID volumes;
    and wherein a RAID component is the source of the event and the event is a RAID notification received by a mapper component from the RAID component, the RAID component sending RAID notifications continually until it receives a reply with information about the reclaimed data storage space;
    and wherein both the first node and the second node have respective RAID components and receive respective RAID notifications therefrom, and each node responds to each respective RAID notification by checking a respective mailbox for new messages requiring processing.

2. The method of claim 1, wherein the reclaiming is directed to an existing mapping data structure having entries that translate between block addresses of one or more volumes of the data storage system to corresponding physical data blocks of the data storage system.

3. The method of claim 1, wherein the first node responds to the RAID notification before the second node and thus assumes a role of primary node in the reclaiming of the data storage space.

4. The method of claim 1, wherein the reclaiming of the data storage space at the second node includes relocating data and updating persistent mapping data for the data storage space.

5. The method of claim 1, wherein the data storage system maintains first and second mailboxes for inter-node communications, the first mailbox being used to transfer the request message from the first node to the second node, and the second mailbox being used to transfer the completion message from the second node to the first node.

6. The method of claim 5, wherein the first node first posts the request message to the first mailbox, and then sets the posted request message to a Ready status in a separate action performed in conjunction with the local cleanup of the first-node mapping data, the Ready status indicating to the second node that the request message is ready for processing by the second node.

7. The method of claim 5, further including, by the first node in response to the completion message, initiating cleanup of cached mapping data in a deferred background process, prior to signaling to the source of the event, and subsequently removing the completion message from the second mailbox.

8. A data storage system comprising physical data storage, an interface to data storage clients, and processing nodes executing computer program instructions to coordinate a reclaiming of data storage space among the processing nodes including:
    by a first node in response to an event, performing local cleanup of first node mapping data and issuing a request message to a second node, the request message identifying the data storage space and indicating that the data storage space is to be reclaimed;
    by the second node in response to the request message, performing local cleanup of second-node mapping data and issuing a completion message to the first node, the completion message indicating that the second node has completed its part of the reclaiming of the data storage space; and
    by the first node in response to the completion message, marking the data storage space as being reclaimed and signaling to a source of the event that the data storage space is available for new use within the data storage system,
    wherein the data storage system implements redundant array of independent disks (RAID) to realize corresponding RAID volumes, and the reclaiming of the data storage space is performed to obtain storage extents for rebuilding one of the RAID volumes;

and wherein a RAID component is the source of the event and the event is a RAID notification received by a mapper component from the RAID component, the RAID component sending RAID notifications continually until it receives a reply with information about the reclaimed data storage space;

and wherein both the first node and the second node have respective RAID components and receive respective RAID notifications therefrom, and each node responds to each respective RAID notification by checking a respective mailbox for new messages requiring processing.

9. The data storage system of claim 8, wherein the reclaiming is directed to an existing mapping being a data structure having entries that translate between block addresses of one or more volumes of the data storage system to corresponding physical data blocks of the data storage system.

10. The data storage system of claim 8, wherein the first node responds to the RAID notification before the second node and thus assumes a role of primary node in the reclaiming of the data storage space.

11. The data storage system of claim 8, wherein the reclaiming of the data storage space at the second node includes relocating data and updating persistent mapping data for the data storage space.

12. The data storage system of claim 8, wherein the data storage system maintains first and second mailboxes for inter-node communications, the first mailbox being used to transfer the request message from the first node to the second node, and the second mailbox being used to transfer the completion message from the second node to the first node.

13. The data storage system of claim 12, wherein the first node first posts the request message to the first mailbox, and then sets the posted request message to a Ready status in a separate action performed in conjunction with the local cleanup of the first-node mapping data, the Ready status indicating to the second node that the request message is ready for processing by the second node.

14. The data storage system of claim 12, wherein the first node responds to the completion message by initiating cleanup of cached mapping data in a deferred background process, prior to signaling to the source of the event, and subsequently removing the completion message from the second mailbox.

* * * * *